United States Patent
Wicken et al.

(10) Patent No.: US 9,833,722 B2
(45) Date of Patent: *Dec. 5, 2017

(54) BALLOON DISPLAY SYSTEM

(71) Applicant: Balloon Innovations Inc., Westminster, CO (US)

(72) Inventors: Christopher J. Wicken, Golden, CO (US); Gregg A. Wicken, Boulder, CO (US)

(73) Assignee: BALLOON INNOVATIONS INC., Westminster, CO (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/076,182

(22) Filed: Mar. 21, 2016

(65) Prior Publication Data

US 2016/0220917 A1 Aug. 4, 2016

Related U.S. Application Data

(63) Continuation of application No. 14/635,898, filed on Mar. 2, 2015, now Pat. No. 9,352,240, which is a
(Continued)

(51) Int. Cl.
*A63H 3/06* (2006.01)
*A63H 27/10* (2006.01)
(Continued)

(52) U.S. Cl.
CPC ............. *A63H 27/10* (2013.01); *F16M 11/16* (2013.01); *F16M 11/22* (2013.01); *F16M 13/02* (2013.01);
(Continued)

(58) Field of Classification Search
USPC .......... 248/27.8, 156, 346.01, 346.03, 346.2, 248/346.5, 910, 694, 504, 507, 508, 506,
(Continued)

(56) References Cited

U.S. PATENT DOCUMENTS 262,517 A 8/1882 Hendrie
1,527,046 A 10/1922 Ingram
(Continued)

OTHER PUBLICATIONS

U.S. Appl. No. 14/742,855, filed Jun. 18, 2015, First Inventor: Christopher J. Wicken.
(Continued)

*Primary Examiner* — Terrell McKinnon
*Assistant Examiner* — Michael McDuffie
(74) *Attorney, Agent, or Firm* — Berg Hill Greenleaf & Ruscitti LLP.

(57) ABSTRACT

The balloon display system used in indoor and outdoor show rooms and the like. The system includes a heavy plastic inflatable balloon. The balloon is mounted on top of a circular balloon holder cup. The cup and the balloon are attached to an upper end of a flexible rod. A lower end of a flexible rod can be attached to a flexible or a rigid, hollow mounting pole. A lower end of the mounting pole can be attached to an upper end of a ground stake. A lower end of the ground stake is inserted into a ground surface. Also the lower end of the mounting pole can be mounted on top of weighted base or stand or other upright objects. The system is designed to display one balloon or a plurality of balloons in a balloon cluster.

5 Claims, 5 Drawing Sheets

Related U.S. Application Data continuation of application No. 13/442,206, filed on Apr. 9, 2012, now Pat. No. 8,968,047.

(60) Provisional application No. 61/518,587, filed on May 9, 2011.

(51) Int. Cl.
  *F16M 11/16* (2006.01)
  *F16M 11/22* (2006.01)
  *F16M 13/02* (2006.01)

(52) U.S. Cl.
  CPC ............... *A63H 2027/1008* (2013.01); *A63H 2027/1041* (2013.01)

(58) Field of Classification Search
  USPC ................................................. 248/127, 530
  See application file for complete search history.

(56) References Cited

U.S. PATENT DOCUMENTS

| | | | |
|---|---|---|---|
| 1,512,831 A | 10/1924 | Dunnell | |
| 1,535,396 A | 4/1925 | Buehler | |
| 1,648,338 A | 11/1927 | Gains | |
| 1,677,379 A | 7/1928 | Annin | |
| 1,782,070 A | 11/1930 | Lazarus | |
| 1,788,157 A | 1/1931 | Hogan | |
| 2,143,691 A | 4/1938 | Goldberg et al. | |
| 2,209,875 A | 7/1940 | Eichelsdoerfer | |
| 2,488,396 A | 11/1949 | Gottholm | |
| 2,664,667 A | 1/1954 | Burroughs | |
| 2,840,948 A * | 7/1958 | Stickley | A63H 27/10 446/223 |
| 2,922,252 A * | 1/1960 | Dam | A63H 27/10 403/217 |
| 2,924,041 A * | 2/1960 | Jackson | A63H 27/10 251/353 |
| 3,150,460 A | 9/1964 | Dees | |
| 3,162,409 A | 12/1964 | Straayer | |
| 3,192,568 A | 7/1965 | Nicholls | |
| 3,366,999 A | 2/1968 | Darby | |
| 3,439,079 A | 4/1969 | McDowell | |
| 3,892,081 A * | 7/1975 | Goral | E01F 9/658 116/63 P |
| 3,920,207 A | 11/1975 | Adamaitis | |
| 4,035,462 A | 7/1977 | Lane, Jr. | |
| 4,589,854 A * | 5/1986 | Smith | A63H 27/10 40/214 |
| 4,712,510 A | 12/1987 | Tae-Ho | |
| 4,794,498 A * | 12/1988 | Neumeier | A63H 27/10 362/186 |
| 4,895,545 A | 1/1990 | Nelson et al. | |
| 4,953,713 A * | 9/1990 | Yaffe | A47F 5/04 206/460 |
| 5,027,992 A | 7/1991 | Murray | |
| 5,036,985 A | 8/1991 | Lovik | |
| 5,052,733 A | 10/1991 | Cheung et al. | |
| 5,127,867 A | 7/1992 | Lau | |
| 5,188,332 A | 2/1993 | Callas | |
| 5,203,530 A * | 4/1993 | Liu | A63H 27/10 248/309.1 |
| 5,234,726 A | 8/1993 | Dahan | |
| 5,282,768 A | 2/1994 | Akman | |
| 5,564,575 A | 10/1996 | Casement | |
| 5,575,470 A | 11/1996 | Sherman | |
| 5,746,461 A | 5/1998 | Broberg | |
| 5,769,474 A | 6/1998 | Moore | |
| 5,823,365 A * | 10/1998 | Page | A47F 5/0892 211/113 |
| 5,873,764 A | 2/1999 | Scherr | |
| 5,938,255 A | 8/1999 | Rose et al. | |
| 5,944,576 A | 8/1999 | Nelson et al. | |
| 6,176,758 B1 | 1/2001 | Wu | |
| 6,273,479 B1 * | 8/2001 | Carlson | A63H 27/10 289/1.2 |
| 6,422,914 B1 | 7/2002 | Nelson | |
| 6,478,057 B1 | 11/2002 | Bearss et al. | |
| 6,478,651 B1 | 11/2002 | Weir | |
| 6,745,904 B1 * | 6/2004 | Komar | A47F 5/01 211/13.1 |
| 6,923,141 B1 | 8/2005 | Staats | |
| 6,935,268 B1 | 8/2005 | Hawkins | |
| 6,938,871 B1 | 9/2005 | Carlson | |
| 6,969,295 B1 | 11/2005 | Sidwell | |
| D517,123 S | 3/2006 | Sidwell | |
| 7,017,511 B2 | 3/2006 | Fisher | |
| 7,249,991 B1 | 7/2007 | Watson | |
| 7,588,477 B2 * | 9/2009 | Sidwell | A63H 27/10 446/220 |
| 7,611,395 B2 | 11/2009 | Bonsembiante | |
| D610,208 S | 2/2010 | Hou | |
| 7,810,265 B2 | 10/2010 | Beatty | |
| 7,854,642 B2 * | 12/2010 | Nelson | A63H 27/10 248/309.1 |
| 7,967,344 B2 * | 6/2011 | Herren | A63H 27/10 289/17 |
| 8,152,588 B2 | 4/2012 | Hua | |
| D659,200 S | 5/2012 | Wicken | |
| 8,544,407 B2 | 10/2013 | Spray | |
| 8,789,565 B1 | 7/2014 | Wicken | |
| 8,840,440 B2 | 9/2014 | Pierce | |
| 8,968,047 B1 * | 3/2015 | Wicken | A63H 27/10 211/13.1 |
| 9,087,462 B1 | 7/2015 | Gallus | |
| 9,132,595 B1 | 9/2015 | Wicken et al. | |
| 9,809,784 | 11/2017 | Wang et al. | |
| 2001/0045074 A1 | 11/2001 | Kim | |
| 2003/0071185 A1 | 4/2003 | Casapulla | |
| 2004/0077268 A1 * | 4/2004 | Wainohu | A63H 27/10 446/222 |
| 2006/0011793 A1 * | 1/2006 | Dupuis | H01Q 1/1207 248/205.5 |
| 2006/0289707 A1 * | 12/2006 | Greenwald | A63H 27/10 248/127 |
| 2006/0292960 A1 * | 12/2006 | Muller | A63H 27/10 446/220 |
| 2007/0007424 A1 * | 1/2007 | Sifferlin | A63H 27/10 248/506 |
| 2007/0049158 A1 * | 3/2007 | Chou | A63H 27/10 446/220 |
| 2007/0218802 A1 | 9/2007 | Gronethal | |
| 2008/0121309 A1 | 5/2008 | Boise et al. | |
| 2008/0166942 A1 | 7/2008 | Hou | |
| 2008/0166943 A1 | 7/2008 | Hou | |
| 2009/0197502 A1 | 8/2009 | Nelson et al. | |
| 2011/0240823 A1 | 10/2011 | Hua | |
| 2011/0253876 A1 * | 10/2011 | Odell | E04H 12/2215 248/530 |
| 2011/0290171 A1 | 12/2011 | Brick | |
| 2012/0015581 A1 | 1/2012 | Feldstein | |
| 2012/0211614 A1 | 8/2012 | Parello et al. | |
| 2014/0096867 A1 | 4/2014 | Cayton | |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
Amazon: Arizona Balloons; Jan. 24, 2013.
Free Patents Online IP Research & Communities—Rotational Molding; Jan. 24, 2013.
Giant Advertising Balloons; Jan. 24, 2013.

(56) References Cited

OTHER PUBLICATIONS

Polyurethane Balloons—Balloon Country; Jan. 24, 2013.
Professional Weather Balloons, 3, 8, and 16 Foot Diameters, Edmund Scientific; Jan. 24, 2013.
Roto-Balloon Printing; Jan. 24, 2013.
Weather Balloons—NovaLynx Corporation; Jan. 24, 2013.
Design U.S. Appl. No. 29/4444,898, filed Feb. 5, 2013, First Inventor: Christopher J. Wicken.
Free Patents Online IP Research & Communities—Rotomolding; Jan. 24, 2013.
International Application No. PCT/US15/036527, filed Jul. 21, 2015, First Inventor: Christopher J. Wicken.
International Application No. PCT/US15/036527, filed Jul. 21, 2015 entitled "Modular Balloon Support". Search Report dated Sep. 30, 2015, 4 pages.
International Application No. PCT/US15/036527, filed Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.
U.S. Appl. No. 14/831,759, filed Aug. 20, 2015, First Inventor: Christopher J. Wicken.
U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.
U.S. Appl. No. 15/076,182, filed Mar. 21, 2016, First Inventor: Christopher J. Wicken. Office Action dated Jun. 3, 2016. 8 pages.
U.S. Appl. No. 29/444,898, filed Feb. 5, 2013, First Inventor: Christopher J. Wicken. Office Action dated Mar. 18, 2016. 7 pages.
Balloons Everywhere, Everyday Catalog & Buyers Guide. Wholesale Balloons & Floral Accessories. © 2007, 2008 Balloons Are Everywhere, Inc. 10 pages.

\* cited by examiner

BALLOON DISPLAY SYSTEM

This application is a continuation of Non-Provisional patent application Ser. No. 14/635,898, filed Mar. 2, 2015; which is a continuation of Non-Provisional patent application Ser. No. 13/442,206, filed Apr. 9, 2012 (now U.S. Pat. No. 8,968,047); which claims the benefit of Provisional Patent Application No. 61/518,587, filed May 9, 2011.

BACKGROUND OF THE INVENTION (a) Field of the Invention

This invention relates to outdoor or indoor showroom and party balloon displays and more particularly, but not by way of limitation, to an outdoor balloon display system having an inflatable balloon or a plurality of inflatable balloons with a circular balloon holder cup, a flexible rod and an optional mounting pole. The balloon system can be attached to a vehicle, mounted on the top of an outside ground surface, mounted on top of a show room floor, and suspended from a wall and like applications.

(b) Discussion of Prior Art

Heretofore in the display of typical latex balloons, the balloons are inflated and suspended individually, using string or ribbon, on the surface of a wall or a roof. Also, the balloons can be held together in a balloon cluster using string, cord and like securing devices. These balloons have a short life, oxidize and lose their color and quickly deflate with the gas passing easily through the balloons latex membrane. Balloons made of Mylar or foil tend to expand with an increase in temperature and pop. Also, these type of balloons can wrinkle or sag with a decrease in temperature. Further, Mylar balloons are created by pressing together two sheets of material and therefore they have an unattractive and visible seam. Still further, Mylar balloons don't have a perfectly round shape along an x-axis or horizontal axis, as used in the subject invention. In U.S. Pat. No. 4,701,148 to Cotey, U.S. Pat. Nos. 4,167,204 and 3,994,324 to Zeyra, different types of valves and apparatus are described for inflating party balloons. Also, U.S. Pat. No. 6,782,675 to Banks et al. describes a system for packaging and distributing balloons in a hydrated state. None of the above mentioned prior art patents describe the unique structure, function and advantages of the subject indoor or outdoor balloon display system with one or more reusable and re-inflatable, heavy plastic polymer, seamless balloons.

SUMMARY OF THE INVENTION

In view of the foregoing, it is a primary objective of the subject invention to provide a balloon display system having an inflatable, re-inflatable and reusable heavy duty, seamless on the interior of the balloon with a small line on the outside of the balloon, plastic polymer balloon. The balloon by design isn't subject to temperature fluctuations, particularly when used outdoors. Also, the balloon is designed to be filled with air, thus eliminating the expense of using helium. Further, the balloon is a rotationally molded plastic balloon so that it can be inflated with much more air pressure when compared to conventional balloons.

Another object of the invention is the balloon can also be quickly deflated for ease in transporting and storage and at a later date inflated again for display. The balloon can be used time and again without the added expense of replacing deflated or punctured balloons. The balloon display system can be used in showrooms, party rooms, and various other indoor and outdoor areas having balloon displays. Yet another object of the balloon display system is the heavy-duty balloon is mounted on a balloon holder cup with a flexible rod and a flexible or rigid mounting pole. The flexible rod can be attached to the side of a vehicle parked outside or a vehicle parked inside a showroom. The flexible rod easily moves the attached balloon back and forth for attracting an observer's eye. Also, the flexible or rigid mounting pole can be easily inserted into the top of a ground surface for outdoor display, mounted on various types of brackets attached to signs, poles, fences and windows, and mounted on a weighted base stand. Still another object of the balloon display system is the mounting pole can include one or more balloon cluster brackets. The balloon cluster brackets are used for attachment to a lower end of flexible rod with attached balloon for forming an attractive balloon cluster display. The subject balloon display system includes a heavy plastic polymer, molded, inflatable balloon. The balloon is mounted on top of a circular balloon holder cup. The cup and the balloon are attached to an upper end of a flexible rod. A lower end of a flexible rod can be attached to a flexible or a rigid, hollow mounting pole. A lower end of the mounting pole can be attached to an upper end of a ground stake. A lower end of the ground stake can be attached to a ground plate and inserted into a ground surface. Also the lower end of the mounting pole can be mounted on top of a weighted base stand or mounted on top of or attached to various objects. These and other objects of the present invention will become apparent to those familiar with balloon displays when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of various types of indoor and outdoor balloon displays, and in which.

DETAILED DESCRIPTION OF THE PREFERRED EMBODIMENTS

Figure 1:
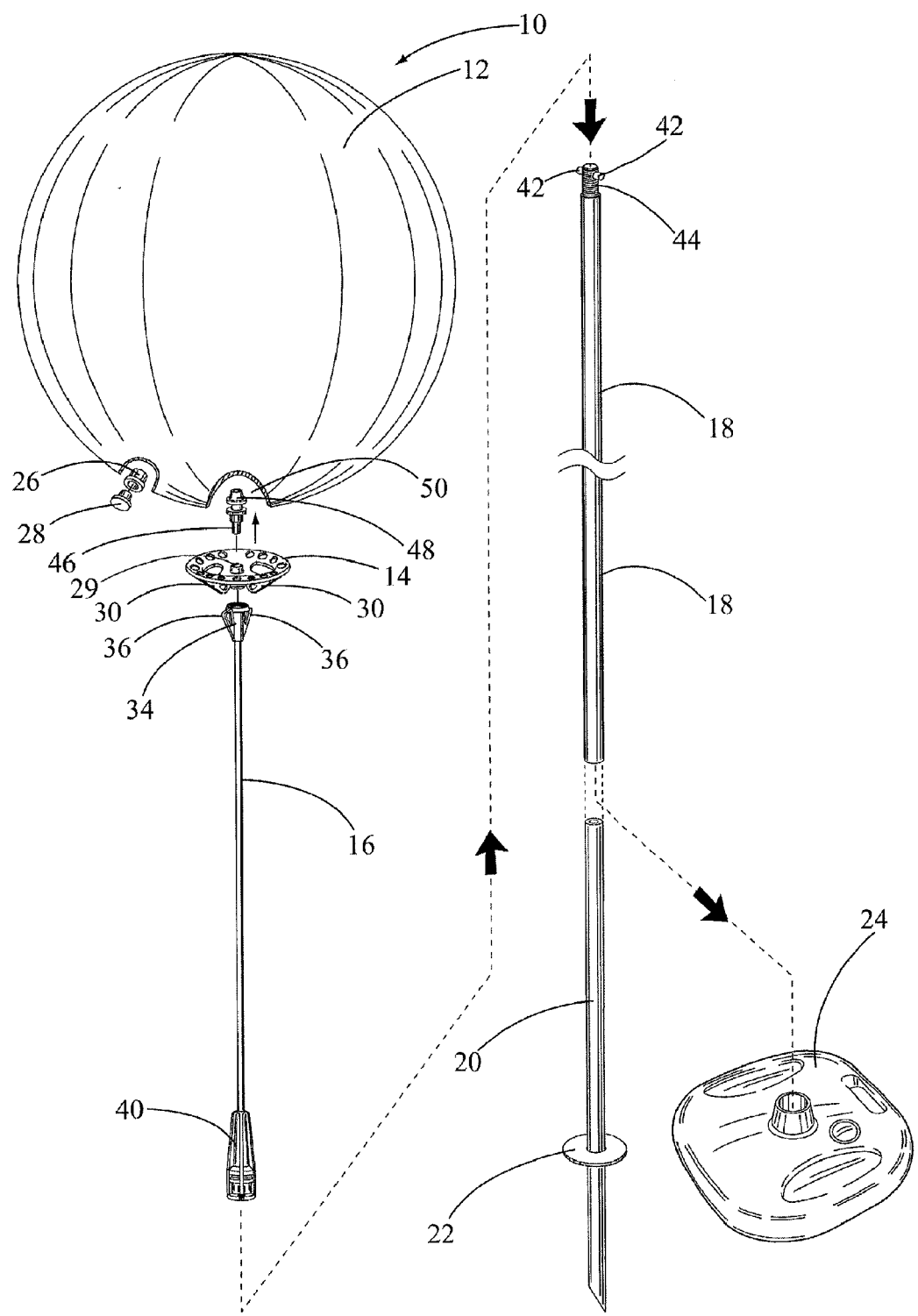
FIG. 1 illustrates an exploded perspective view of the subject balloon display system illustrating an inflatable balloon, a balloon holder cup, a flexible rod and a flexible or rigid mounting pole for mounting on a display stand or inserted into to a ground surface.

In FIG. 1, an exploded perspective view of the subject balloon display system is illustrated having a general reference numeral 10. The balloon display system 10 broadly includes an inflatable balloons, which may include in some embodiments, for example heavy plastic polymer, molded, inflatable balloons 12, a circular balloon holder cup 14 attached to a bottom portion of the balloon 12, a flexible rod 16, made of fiberglass or the like, having an upper end portion disposed next to the cup 14 and the bottom of the balloon 12 and a rigid or flexible, hollow mounting pole 18.

A lower end of the mounting pole can be attached to an anchoring stake 20. A lower end of the stake 20 can be attached to a ground plate 22 and inserted into the top of a ground surface. Also, the lower end of the mounting pole 18 can be inserted into the top of a weighted base stand 24 for holding the balloon display system 10 upright. The hollow mounting pole 18 can be made of a flexible fiberglass or a rigid metal or rigid plastic material.

The balloon 12 includes an inflation and deflation air port 26 for receiving an air port plug 28. The air port 26 is shown in a lower portion of the balloon, but it can be located in various positions on the balloon. By removing the plug 28, the balloon 12 can be quickly inflated, deflated or re-inflated with additional air using an air pump.

The balloon holding cup 14 includes a center hole 29 and three equally spaced apart cup flanges 30 with cup flange holes 32 disposed around the bottom of the cup. The cup flange holes 32 can be seen more clearly in FIG. 2. The top of the cup 14 is concave in shape for engaging a convex bottom portion of the balloon 12.

The flexible rod 16 includes an upper end portion with a rod bracket 34 which in some embodiments may have a flared upper portion. The rod bracket 34 includes a pair of equally spaced apart rod bracket flanges 36, with rod bracket flange holes 38, disposed around the side of the bracket. The flange holes 38 are shown more clearly in FIG. 2. The flexible rod 16 also includes a lower end portion with a rod socket 40. An inside of the rod socket 40 includes a twist lock used engaging a pair of outwardly extending studs 42 mounted on an upper end portion 44 of the hollow mounting pole 18 for securing the flexible rod 16 on the top of the hollow pole 18. Also shown in this drawing is a balloon attachment plug 46 having a male barbed upper portion 48, which is used for inserting into a female valve housing 50 in the bottom of the balloon 12, for securing the balloon thereto. The plug 46 also includes a lower threaded end portion 52, which is received through the center hole 29 in the cup 14 and threaded into the top of the rod bracket 34. This structure of the plug 46 can be seen more clearly in FIG. 2. While the plug 46 is shown in the drawings, it should be kept in mind various types of attachments or fasteners can be used equally well for securing the flexible rod 16 to the bottom of the balloon 12.

Figure 2:
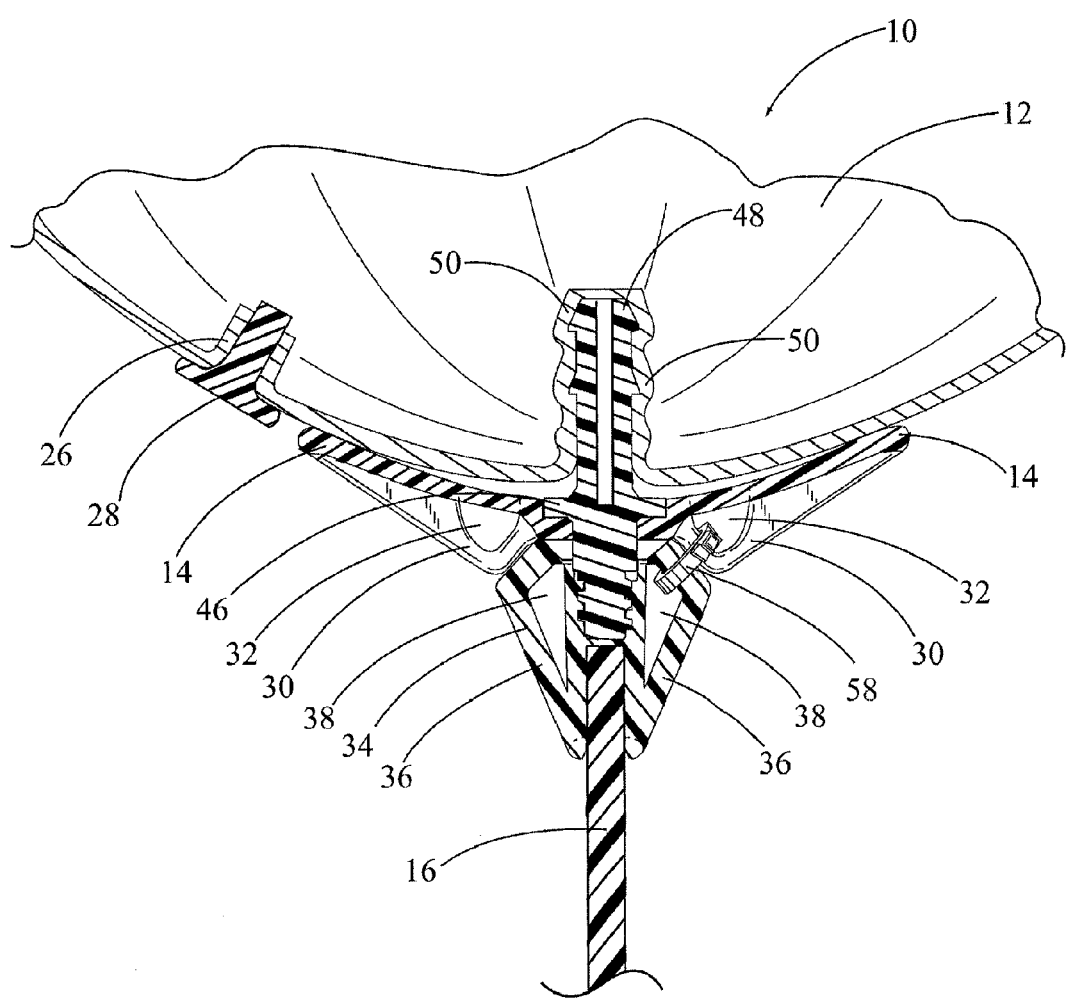
FIG. 2 illustrates a lower portion of the balloon, a balloon holder cup, a rod bracket attached to an upper end portion of a flexible rod and a balloon attachment plug shown in cross section. The attachment plug is used for receipt through a center hole in the cup and into a female valve housing in the bottom of the balloon.

In FIG. 2, an enlarged view of a bottom portion of the balloon 12, the cup 14, the attachment plug 46 and the rod bracket 34 are shown in cross section. When the plug 46 and rod bracket 34 are secured to the bottom of the balloon 12, the cup flanges 30 of the cup 14 are disposed next to the rod bracket flanges 36 of the rod bracket 34. At this time, one or more anti-theft zip ties 58 can be passed through the adjacent cup flange holes 32 and the bracket flange holes 38 for securing the cup flanges 30 and the rod bracket flanges 36 together to prevent the balloon display system 10 from being easily stolen.

Figures 3, 4:
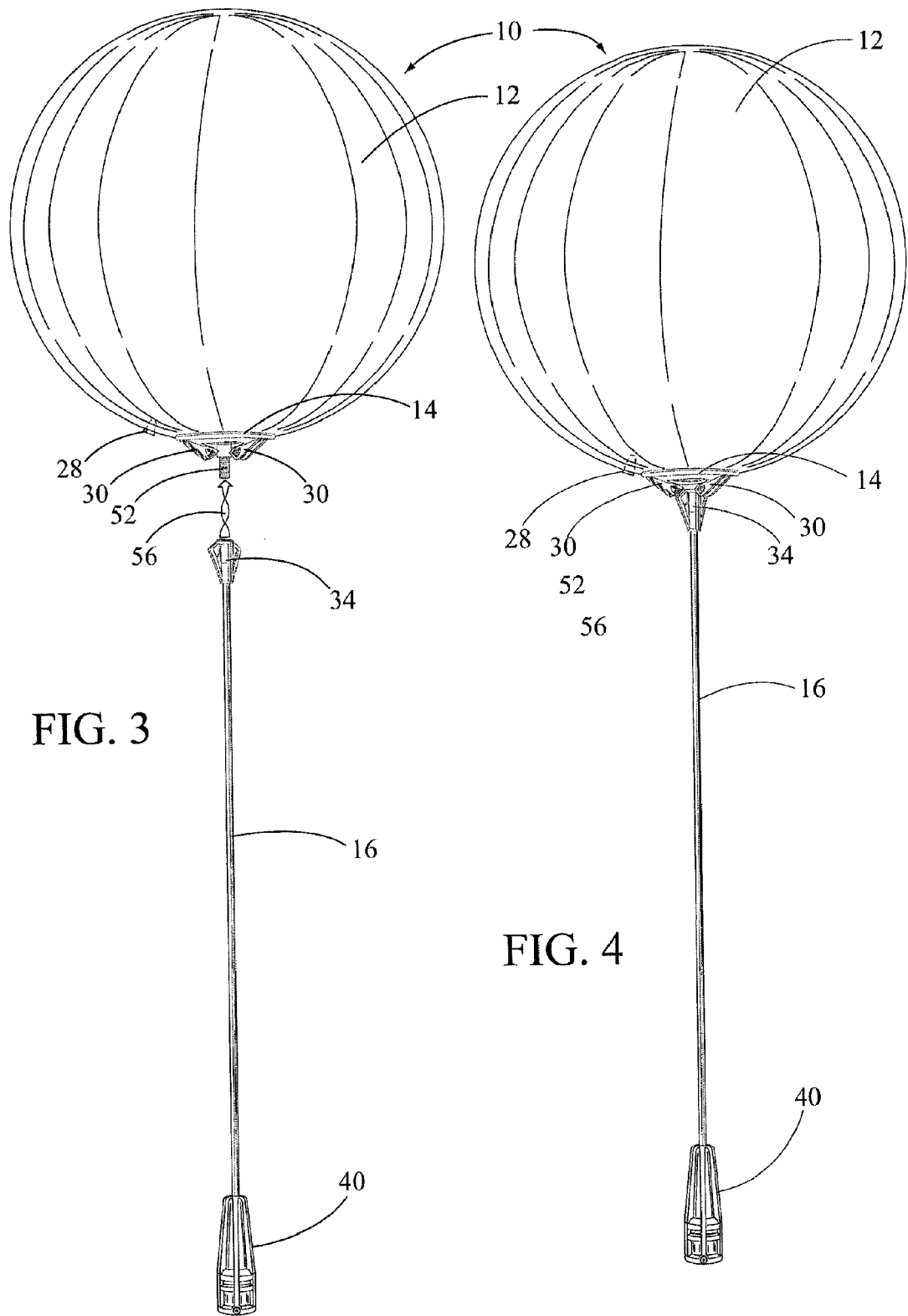
FIG. 3 is a perspective view of the balloon and the rod bracket positioned for attaching the flexible rod to a lower threaded end of the attachment plug. The plug is shown attached to the balloon holder cup and the balloon.
FIG. 4 is similar to FIG. 3 and illustrates a perspective view of the flexible rod secured to the bottom of the balloon.

In FIG. 3, the rod bracket 34 is shown attached to the top of the flexible rod 16. The rod bracket 34 includes a threaded female opening in the top thereof and positioned for receiving the threaded end portion 52 of the plug 46, as indicated by the arrow 56.

In FIG. 4, the flexible rod 16 is shown secured to the cup 14 and the bottom of the balloon 12 using the rod bracket 34 attached to the lower threaded end portion 52 of the barbed plug 46.

Figure 5:
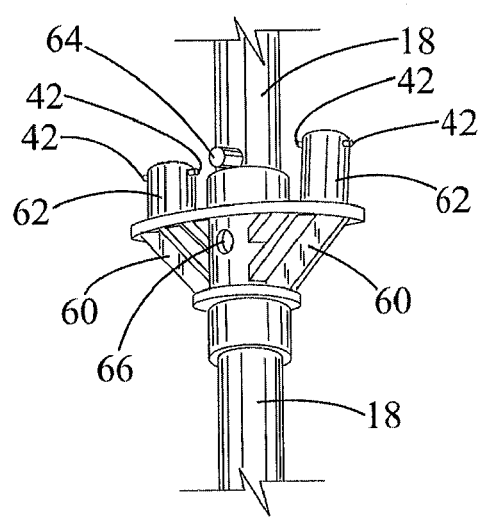
FIG. 5 illustrates an enlarged perspective view of a balloon cluster pole bracket positioned for attachment to a portion of the mounting pole.
Figures 7, 8:
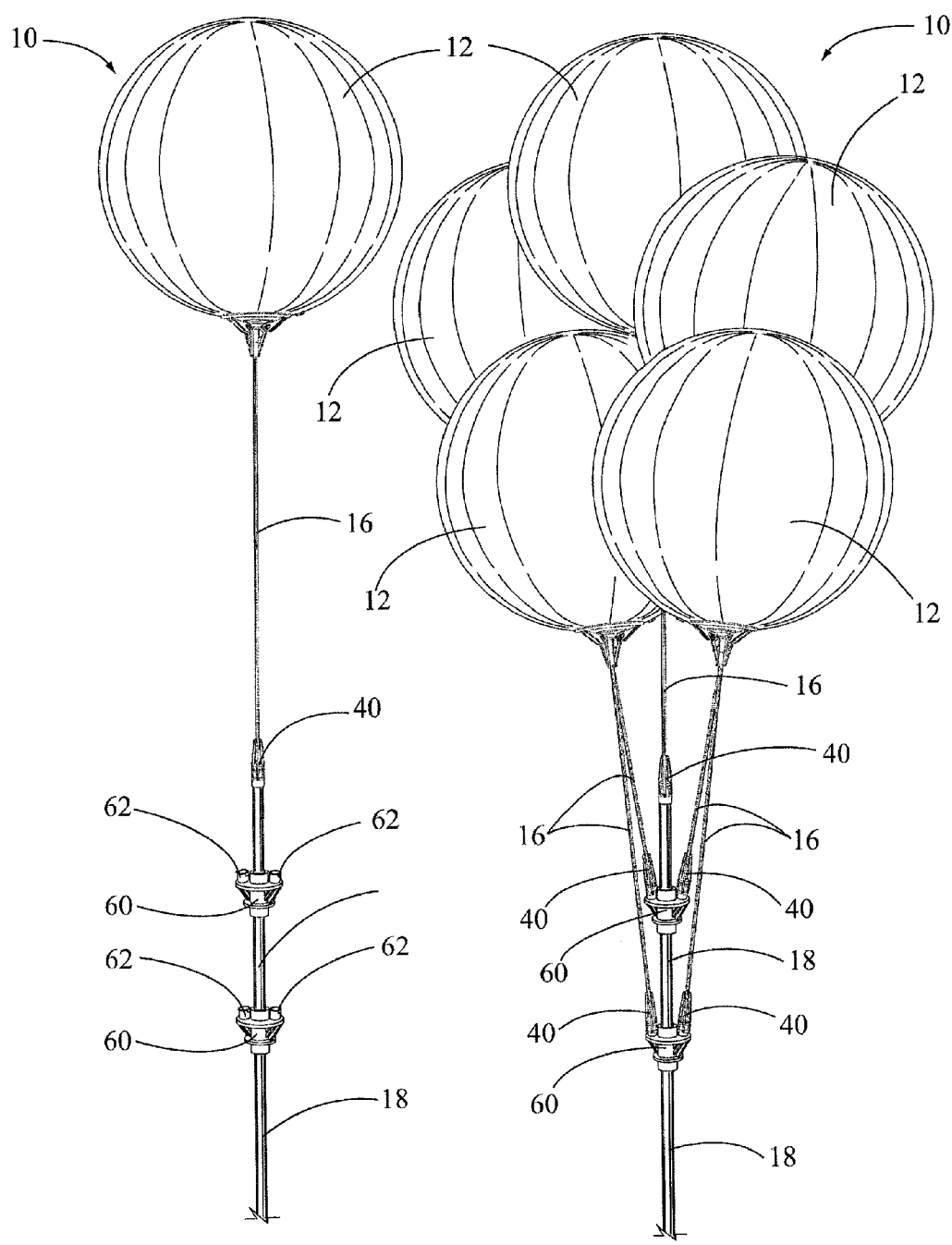
FIG. 7 is a perspective view of the balloon display system with the mounting pole having a pair of spaced apart balloon cluster pole brackets. The pole brackets are used for attaching additional flexible rods with attached balloons for forming a balloon cluster.
FIG. 8 illustrates a perspective view of the subject balloon display system having a cluster of five flexible rods with attached balloons mounted on the pole.

In FIG. 5, an enlarged perspective view of a balloon cluster pole bracket 60 is shown received around a portion of the mounting pole 18. The bracket 60 includes a pair of upwardly extending, twist lock couplings 62 having a pair of studs 42. Each coupling 62 is used for inserting into the rod socket 40 of the flexible rod 16 with balloon 12 to form a decorative balloon duster, as shown in FIG. 8. Also shown in this drawing is the mounting pole 18 having a spring biased, lock button 64. The pole bracket 60 includes a button hole 66.

Figure 6:
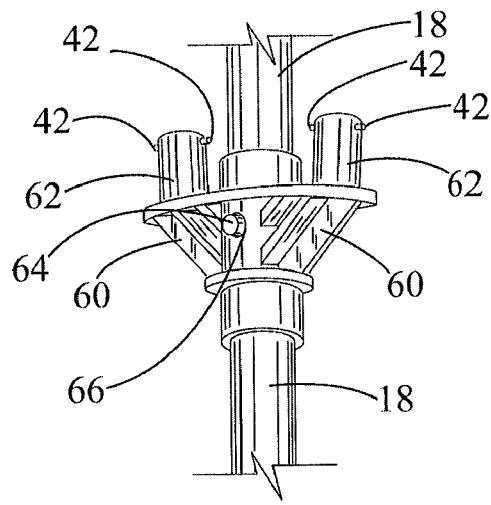
FIG. 6 is similar to FIG. 5 and shows the balloon cluster pole bracket attached to the mounting pole using a spring biased lock button.

In FIG. 6, another enlarged perspective view of the balloon cluster pole bracket 60 is shown. By pushing the button 64 inwardly and sliding the bracket upwardly, the button 64 can be indexed with the button hole 66. At this time, the button 64 is received through the button hole 66, thus locking the balloon cluster pole bracket 60 on the mounting pole 18. Obviously, the balloon cluster pole bracket 60 can be attached to the mounting pole 18 in a variety of ways and without departing from the spirit and scope of the subject invention.

In FIG. 7, another perspective view of the balloon display system 10 is illustrated. In this view, the hollow mounting pole 18 includes a pair of spaced apart balloon cluster pole brackets 60 positioned for attaching additional flexible rods 16 with attached balloons 12.

In FIG. 8, a perspective view of a completed display of cluster balloons 12 is shown using the subject balloon display system 10. In this example and by using two of the balloon cluster pole brackets 60, five of the flexible rods 16 with attached balloons 12 are shown mounted on the pole 18.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A balloon cluster display system comprising:
   at least one mounting pole having at least one coupling;
   a plurality of balloon cluster pole brackets each having two halves secured together in a biased configuration around said mounting pole where each half of said balloon cluster pole bracket has at least one coupling;
   a plurality of first flexible rods configured to be secured to said balloon cluster pole bracket couplings;
   at least one second flexible rod configured to be secured to said mounting pole coupling; and a plurality of high-pressure helium-free inflatable balloons configured to be secured to the upper portion of said first, and said second flexible rods forming a balloon cluster configuration.

2. A balloon cluster display as described in claim 1 wherein said upper portion of said flexible rod comprises a flexible rod having at least one rod bracket.

3. A balloon cluster display system as described in claim 2 wherein said rod bracket comprises a cup.

4. A balloon cluster display system as described in claim 1 wherein said coupling comprises a coupling selected from the group consisting of: a snap lock coupling; a twist lock coupling; and a threaded lock coupling.

5. A balloon cluster display system as described in claim 1 wherein said balloon cluster configuration comprises five high-pressure helium-free inflatable balloons.

\* \* \* \* \*